UNITED STATES PATENT OFFICE.

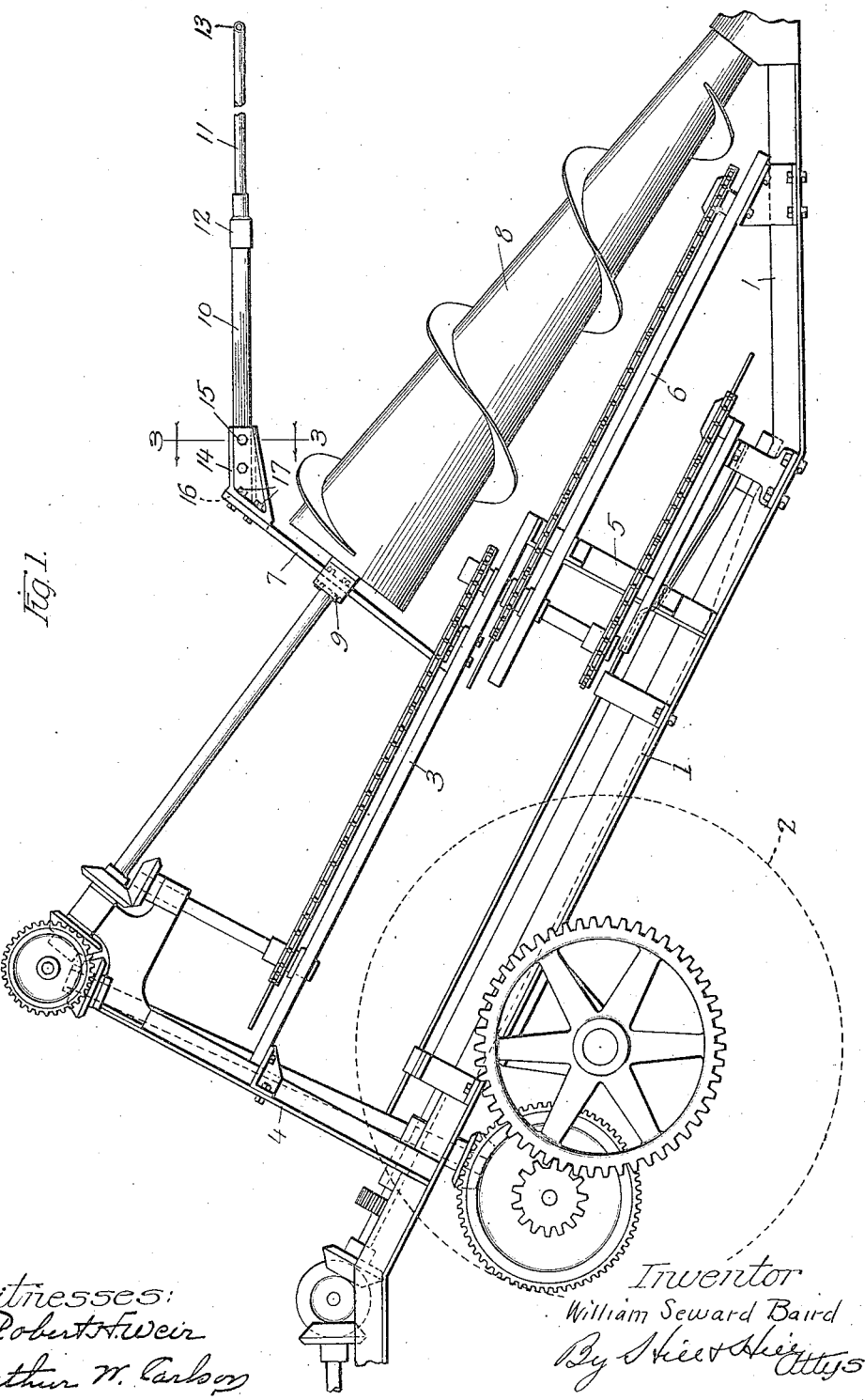

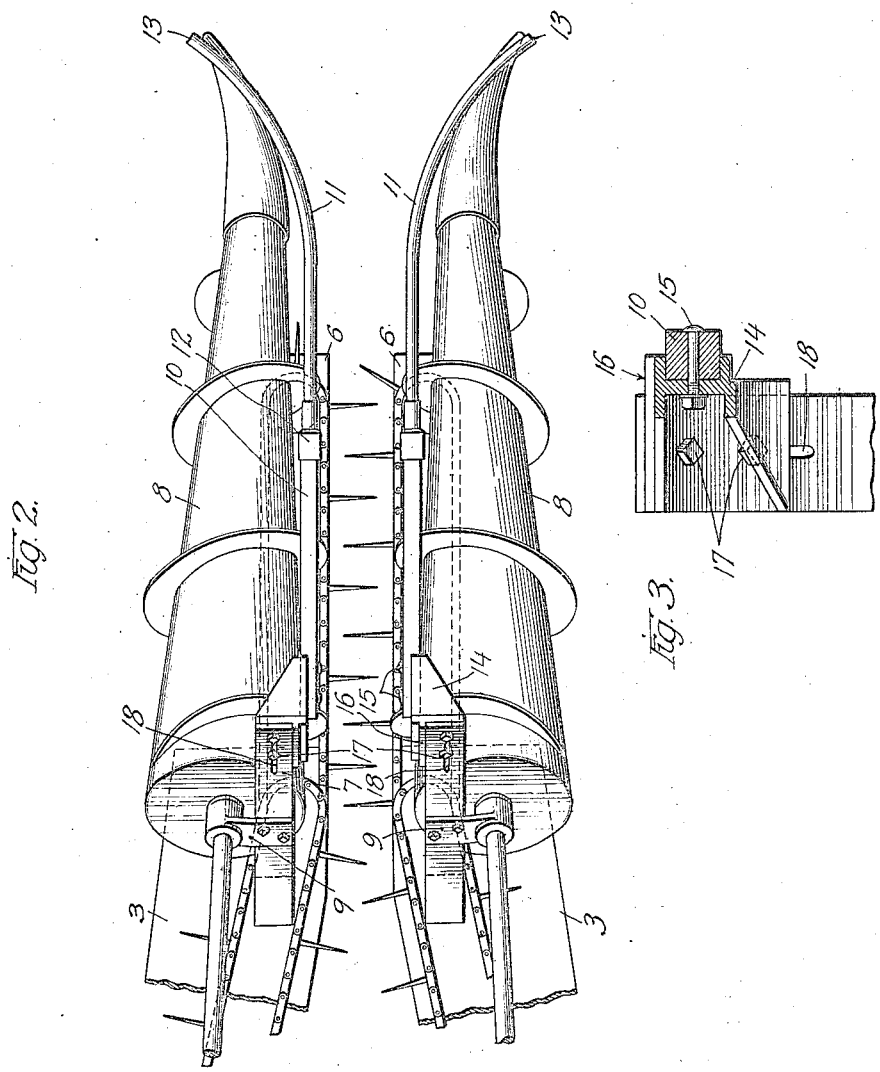

WILLIAM SEWARD BAIRD, OF DECATUR, ILLINOIS, ASSIGNOR TO BAIRD CORN HUSKER CO., OF CHAMPAIGN, ILLINOIS, A CORPORATION OF SOUTH DAKOTA.

STALK-ARM ATTACHMENT FOR CORN-HARVESTING MACHINES.

1,419,347.  Specification of Letters Patent.  Patented June 13, 1922.

Application filed March 20, 1918. Serial No. 223,553.

*To all whom it may concern:*

Be it known that I, WILLIAM SEWARD BAIRD, a citizen of the United States, residing at Decatur, in the county of Macon and State of Illinois, have invented certain new and useful Improvements in Stalk-Arm Attachments for Corn-Harvesting Machines, of which the following is a description.

My invention belongs to that general class of devices known as corn harvesting machines, and relates particularly to an attachment for the type of machines illustrated in my prior patents or like machines, which attachment is arranged above or adjacent the pick-up chains and rolls or their equivalents. More particularly it relates to what may be termed stalk arms, which are provided to steady the stalks as various parts of the pick-up chains and rolls may engage them, thereby preventing the ears of corn being jerked or whipped off at the quick motion of the stalk. When the corn stalks are dry and brittle or frozen, they are very easily broken off close to the ground, with the possible resultant loss of the ear. With my device, however, the stalks are caught and loss of the corn prevented. The invention has among its objects the production of a device of the kind described that is simple, efficient, durable and satisfactory for use on corn harvesting machines or the like. Many other objects and advantages of the construction herein shown and described will be obvious to those skilled in the art from the disclosure herein given.

To this end, my invention consists in the novel form, construction, arrangement and combination of parts herein shown and described and more particularly pointed out in the claims.

In the drawings, wherein like reference characters indicate like or corresponding parts;

Fig. 1 is a side elevation of a portion of a corn harvesting machine illustrating the application of my improved attachment;

Fig. 2 is a top plan view of the same; and

Fig. 3 is a sectional view taken substantially on line 3—3 of Fig. 1.

Referring to the drawings, it may be mentioned that only a portion of the machine is shown, the same illustrating the application of my improved stalk arms and the purpose and operation thereof, as well as the preferred location.

As shown in the drawings, 1 represents a portion of the frame carried by the supporting wheels 2, one wheel being shown in dotted. Arranged on the frame part 1 are the frame parts 3, 4, 5 and 6, it being understood that these parts are constructed as desired and may vary in different machines. For this reason I have not considered it necessary to illustrate and describe the machine proper in detail. The frame parts 3 in the construction shown carry the uprights 7, which may support the bearing brackets 9 arranged to carry the rear ends of the pick-up rolls 8, it being understood that the forward end of these rolls are supported in any desired manner. The pick-up chains are shown disposed below the pick-up rolls 8. It may be mentioned that the rolls and chains may be driven in any suitable manner, preferably by suitable intermediate mechanism connected with the axle or running gear of the harvester, so that the rate of travel of the pick-up rolls and chains is dependable upon the travel of the vehicle or harvesting machine.

Mounted above or adjacent, preferably above, the pick-up rolls and chains and preferably above the ear line of the stalk, are arranged the stalk arms, which in the construction shown consists of parts 10—11. These arms are supported in any suitable manner. As shown, the parts 7 are extended upwardly to the desired point and the stalk arms secured thereto. I have shown the stalk arms each consisting of a substantially rigid part 10 provided with a somewhat resilient forward end part 11, the parts extending substantially parallel with the pick-up chains, and thence turned outwardly at the ends over the shoes at the forward end of the pick-up rolls. Part 10 may be of wood or metal, and carries at its free end a bracket 12 arranged to carry the arm 11, which is preferably in the form of a rod or pipe, having the forward end 13 turned or bent outwardly as most clearly shown in Fig. 2. The arms are secured to the uprights 7 by means of the brackets 14. Referring to Figs. 2 and 3, arm part 10 is secured to bracket 14 by bolts 15, and bracket 14 secured to the upright by means of bolts 17 or their equivalents. The bracket is preferably flanged as at 16 so as to overlie the edge of the upright 7, or similarly constructed to afford a well braced construction. It will be noted also that I preferably slot the upright as at 18 so that the arm and its bracket may be raised or lowered so as to provide adjustment.

It will be noted that with this construction the stalk, even though leaning at an angle, will be caught by the stalk arms and straightened up and steadied. While as before mentioned the stalk arms may be made rigid throughout their length, or that is so that they do not give, by making them slightly yielding or flexible, particularly at the end where they first engage the stalk, when struck by a stalk the shock is not as great on the stalk as it would be with rigid arms. However, after having been caught by the arms, then it is firmly held by the rigid part 10 of the arms. The parts 11, however, should not be so flexible as to in themselves tend to whip the stalk, that is to say, they should not give enough under the impact with the stalk so when recovering they will throw the stalk forcibly the other way. As mentioned, the stalk arms may be adjusted up and down as found desirable. With the arms shown it is practically impossible for the stalks to be whipped back and forth by the pick-up rolls and chains, or from side to side and the ears jerked off. The loss of ears when the stalks are dry and brittle or frozen, caused by the stalks being broken or whipped back and forth, may in some instances be very considerable, consequently the stalk arms accomplish a considerable saving in loss of corn.

Having thus described my invention, it is obvious that various immaterial modifications may be made in the same without departing from the spirit of my invention, hence I do not wish to be understood as limiting myself to the exact form, construction, arrangement and combination of parts herein shown and described or uses mentioned.

What I claim as new and desire to secure by Letters Patent is:—

1. In a harvesting machine of the character described, the combination with pick up rolls and driving means therefor, in combination with means coextensive with said pick up rolls positioned above and between the rolls for engaging stalks and substantially prevent lateral movement of said engaged stalks at the top thereof.

2. In a corn harvesting machine of the kind described, pick-up rolls and means for driving the same, in combination with a pair of arms normally separated at one end arranged on the machine at a point substantially above the ear line of the stalks, and to engage and receive stalks continuously during a movement of the machine to prevent lateral movement of the stalk tops.

3. In a corn harvesting machine of the kind described, pick-up rolls and means for driving the same, in combination with a pair of spaced arms arranged above said rolls with their free ends extending outward from each other.

4. In a corn harvesting machine of the kind described and in combination, pick-up chains and pick-up rolls and means for driving the same, a pair of yielding arms spaced from one another, and arranged substantially in the space between said rolls above the ear line of the stalks, the free ends of said arms extending outwardly and to adjacent a point above the forward end of the pick-up rolls.

5. In a corn harvesting machine of the kind described and in combination, pick-up chains and pick-up rolls, a pair of arms, means for adjustably securing said arms substantially in the space between and above the rolls, said arms being substantially semi-rigid at their forward ends and arranged with the free ends of the arms extending outwardly and to adjacent a point above the forward ends of the pick-up rolls.

6. In a corn harvesting machine of the kind described and in combination, pick-up chains and pick-up rolls, and a pair of arms spaced from one another and arranged substantially in the space between the rolls, the rear ends of said arms being substantially rigid with the forward ends substantially semi-rigid, and extending outwardly and to adjacent a point above the forward end of the pick-up rolls.

7. In a corn harvesting machine of the kind described and in combination, pick-up chains and pick-up rolls, and a pair of adjustably supported arms spaced from one another and arranged substantially in the space between the rolls, the rear ends of said arms being substantially rigid with the forward ends substantially semi-rigid, and extending outwardly and to adjacent a point above the forward end of the pick-up rolls.

8. In a corn harvesting machine, the combination with conveying rolls, of means supported above said rolls and spaced apart a less distance than the distance between the rolls disposed coextensive with said rolls and having a normally open outer end for receiving stalks to prevent lateral movement thereof at the top.

9. In a corn harvesting machine, the combination with conveying rolls, of means supported above said rolls and spaced apart a less distance than the distance between the rolls disposed coextensive with said rolls and having a normally open outer end for receiving stalks to prevent lateral movement thereof at the top, said means comprising spaced bars having relatively rigid inner portions, and resilient outer portions provided with diverging ends.

10. In a corn harvesting machine, the combination with pick up rolls, of a pair of adjustably supported arms disposed above said rolls and extending lengthwise of said rolls along the sides thereof, and means for maintaining said arms in different positions of adjustment, said arms being normally spaced apart at their outer ends to receive stalks during the movement of the machine to prevent lateral movement of the upper ends of the stalk.

11. In a corn harvesting machine, the combination with pick up rolls, of arms supported upon said machine and spaced from one another disposed above said rolls, said arms at their outer ends being composed of resilient material and adapted to receive stalks during a movement of the machine and extending lengthwise of the rolls to substantially the rear ends thereof.

12. In a harvesting machine of the character described, comprising suitable pick up devices, of a pair of arms supported upon said machine above said devices, said arms for a portion of their length being of a relatively rigid structure and at their outer ends being of a relatively resilient formation.

13. In a harvesting machine of the kind described, the combination with pick up devices, of a pair of adjustably supported arms arranged above said devices and spaced apart throughout their length, the outer ends of said arms diverging, and being of a relatively resilient structure to lessen impacts when stalks are engaged, said arms being of a length substantially equal to the length of the rolls.

In testimony whereof, I have hereunto signed my name in the presence of two subscribing witnesses.

WILLIAM SEWARD BAIRD.

Witnesses:
  Roy W. Hill,
  Charles I. Cobb.